United States Patent Office 3,582,517
Patented June 1, 1971

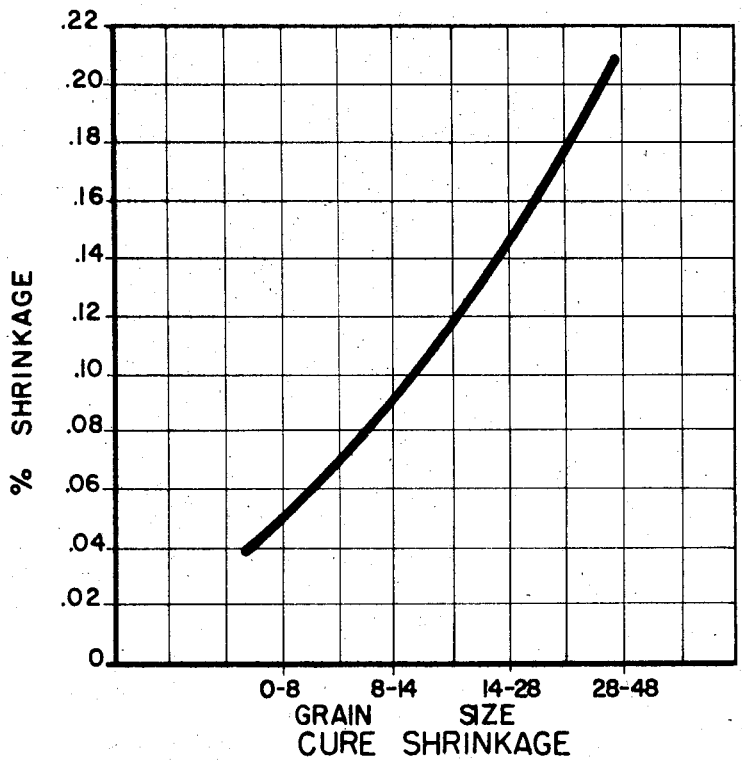
FIG_1a
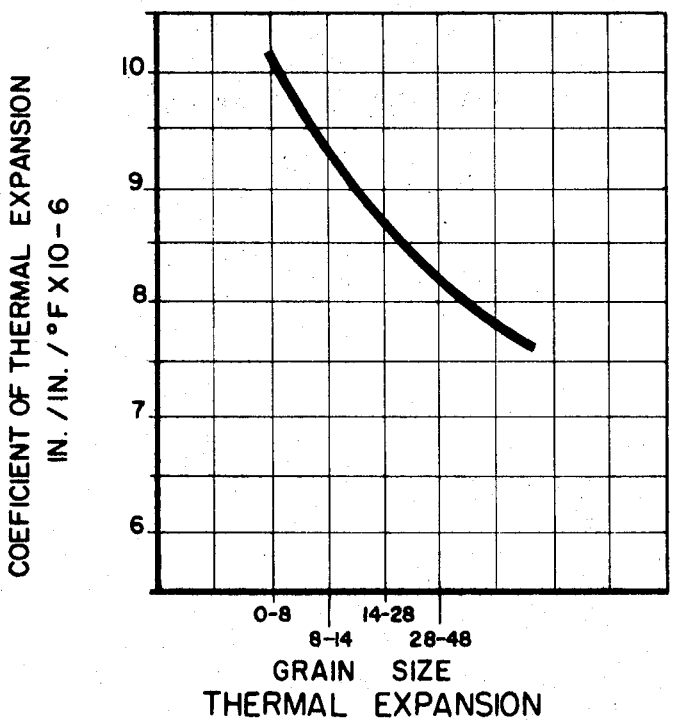
FIG_1b
INVENTORS
JOHN G. BAILEY, JR.
CLARENCE M. HEAD, JR.
CLARENCE W. PHILLIPS
By George C. Sullivan
Agent June 1, 1971  J. G. BAILEY, JR., ET AL  3,582,517
HIGH TEMPERATURE PLASTIC-CERAMIC CASTABLE
Filed May 13, 1968  6 Sheets-Sheet 2
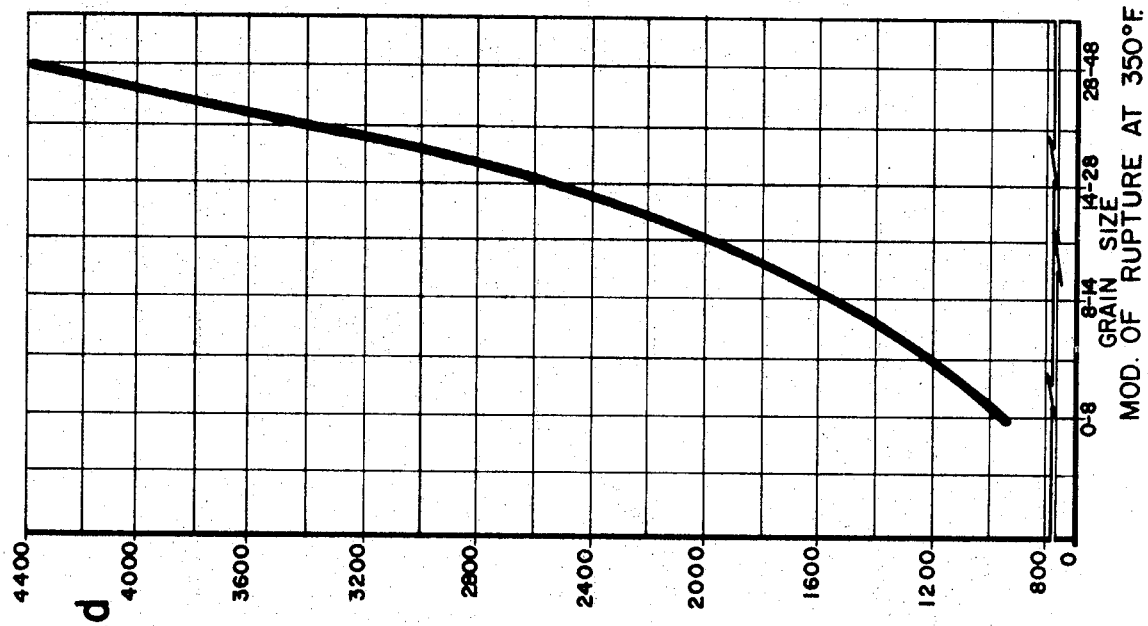
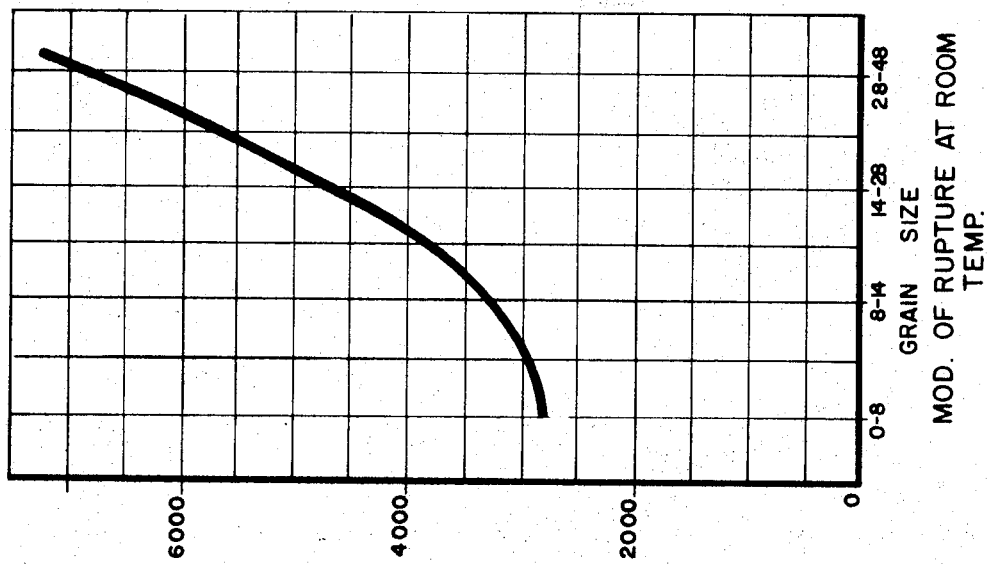
INVENTORS
JOHN G. BAILEY, JR.
CLARENCE M. HEAD, JR.
CLARENCE W. PHILLIPS
By *George C. Sullivan*
Agent INVENTORS
JOHN G. BAILEY, JR.
CLARENCE M. HEAD, JR.
CLARENCE W. PHILLIPS
By *George C. Sullivan*
Agent

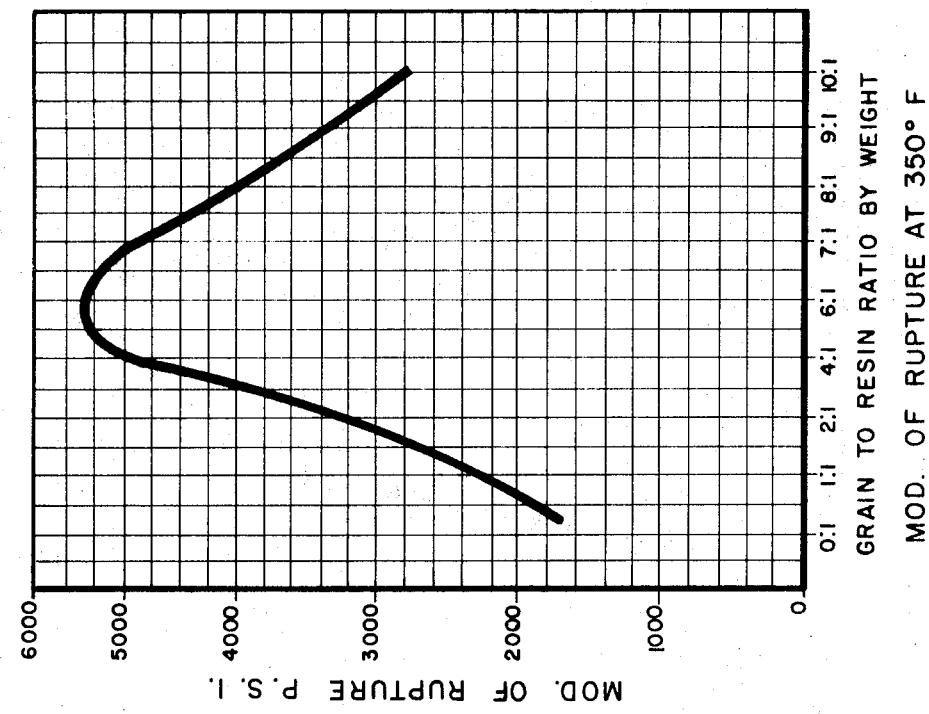
FIG._2d
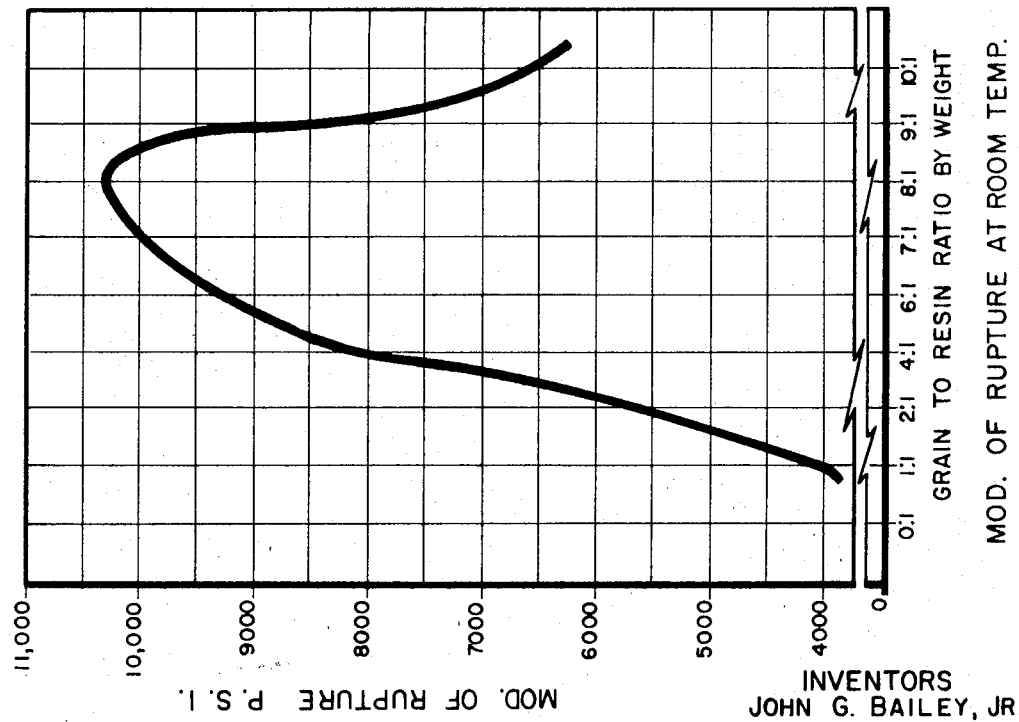
FIG._2c
INVENTORS
JOHN G. BAILEY, JR.
CLARENCE M. HEAD, JR.
CLARENCE W. PHILLIPS
By *George C. Sullivan*
Agent

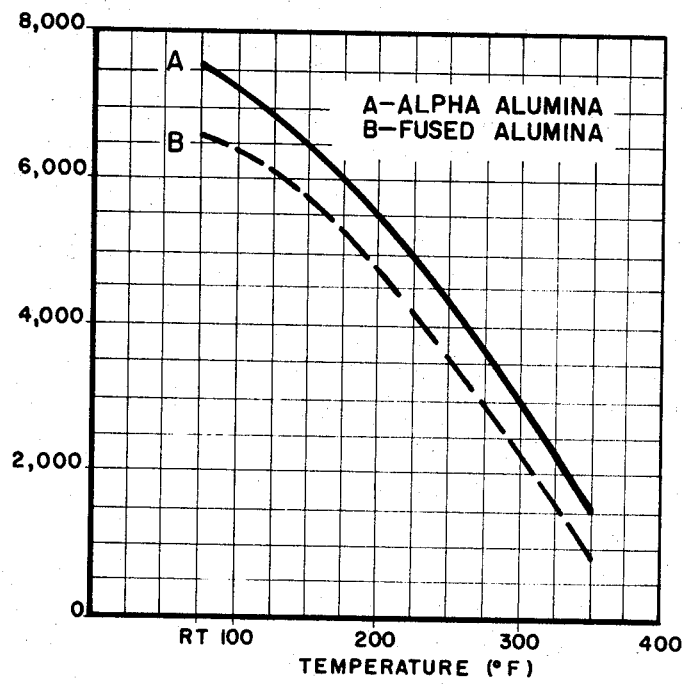
TEMPERATURE EFFECTS ON MODULUS OF RUPTURE OF ALUMINA FILLED EPOXY
FIG_3
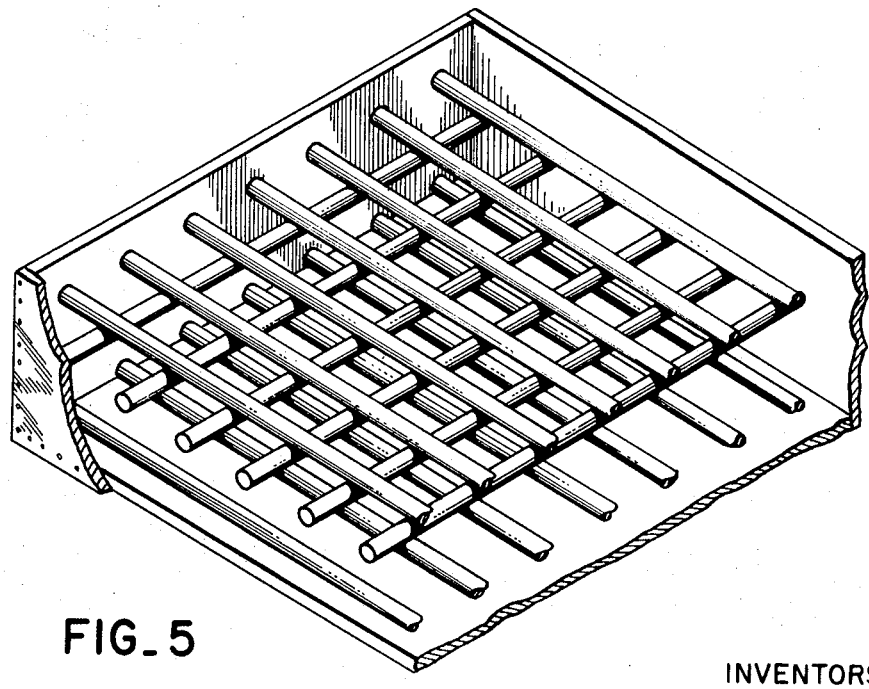
FIG_5

3,582,517
HIGH TEMPERATURE PLASTIC-CERAMIC CASTABLE
John G. Bailey, Jr., Marietta, and Clarence M. Head, Jr., Atlanta, Ga., and Clarence W. Phillips, Ormond Beach, Fla., assignors to Lockheed Aircraft Corporation, Burbank, Calif.
Continuation-in-part of application Ser. No. 423,438, Jan. 5, 1965. This application May 13, 1968, Ser. No. 730,678
Int. Cl. C08g 51/04
U.S. Cl. 260—37EP
6 Claims

ABSTRACT OF THE DISCLOSURE

A high temperature, high tensile strength plastic-ceramic castable suitable for use in easily casting into molded shapes prior to curing; the cured castable having qualities of being wear resistant, chafe resistant, corrosion resistant, heat resistant, and substantially nonshrinkable. The castable consists of a monolithic composition produced by admixing a refractory oxide filler, an epoxy resin and an aliphatic, aromatic or mixture thereof polyfunctional amine curing agent.

---

This application is a continuation-in-part of application Ser. No. 423,438, filed Jan. 5, 1965, by John G. Bailey, Jr. et al. and assigned to the same assignee this application is assigned to; said prior application now abandoned.

This invention relates to a plastic-ceramic composition and is more particularly concerned with a refractory oxide-epoxy composition, to articles made therefrom and to the process of making the same.

In the past, plastics have been used for binding aggregates together. Such prior art compositions have been used for wallboard, insulation material, artificial stone, and the like.

Indeed, resins impregnated with finely divided iron compounds such as magnetic iron oxide have been used for forming magnetic cores and resin impregnated with Fiberglas has had quite wide acceptance for forming structural parts of boats, automobiles, and the like.

Heretofore, it has been believed that aggregates in admixture with a condensation resin had uses limited to low temperature and relatively low tensile strength applications. Contrary to prior art beliefs and practices we have discovered that an admixture of refractory oxide and epoxy resin, the refractory oxide including as a major constituent thereof aluminum oxide, has unexpectedly high tensile strength and is capable of extended use at elevated temperatures in excess of, for example, 250° F. The fact that the admixture of refractory oxide and epoxy resin can be cast into a variety of prescribed shapes prior to being cured and has relatively low shrinkage when cured to final shape enables the composition to be used in a variety of articles including being shaped into matrices or molds from which duplicate products may be formed.

The monolithic composition of the present invention is produced by admixing aluminum oxide to an epoxy resin which in such admixture is cured to the C-stage in a shape defined by a mold into which the mix in the form of a slurry is poured.

An object of this invention is to provide a plastic-ceramic having high strength characteristics at both high and low temperatures.

A further object of this invention is to provide a low cost preparation of a plastic-ceramic material, using conventional equipment in such a production.

A further object of this invention is to provide a plastic-ceramic which is able to be molded in a variety of shapes and forms.

A still further object of this invention is to provide a plastic-ceramic material that has the qualities of being wear resistant, chafe resistant, corrosion resistant, heat resistant, and is substantially nonshrinkable.

Another object of the invention is to provide a process of producing a monolithic body, the process being readily and easily carried out using material which is readily available at reasonable cost.

Another object of the present invention is to provide a monolithic body which is suitable for use as an element of a forming tool.

Other objects of this invention will become more apparent from the description which follows in which:

FIGS. 1a, 1b, 1c and 1d are graphs showing the effects of varying the grain size of alumina in the composition;

FIGS. 2a, 2b, 2c and 2d are graphs showing the effects of varying the alumina grain to resin ratio in the composition;

FIG. 3 is a graph showing the temperature effects on the modulus of rupture of alumina filled epoxy;

FIG. 5 shows an example of how reinforcing rods are installed in a mold so that a casting able to withstand large bending loads may be formed.

Figure 2B:
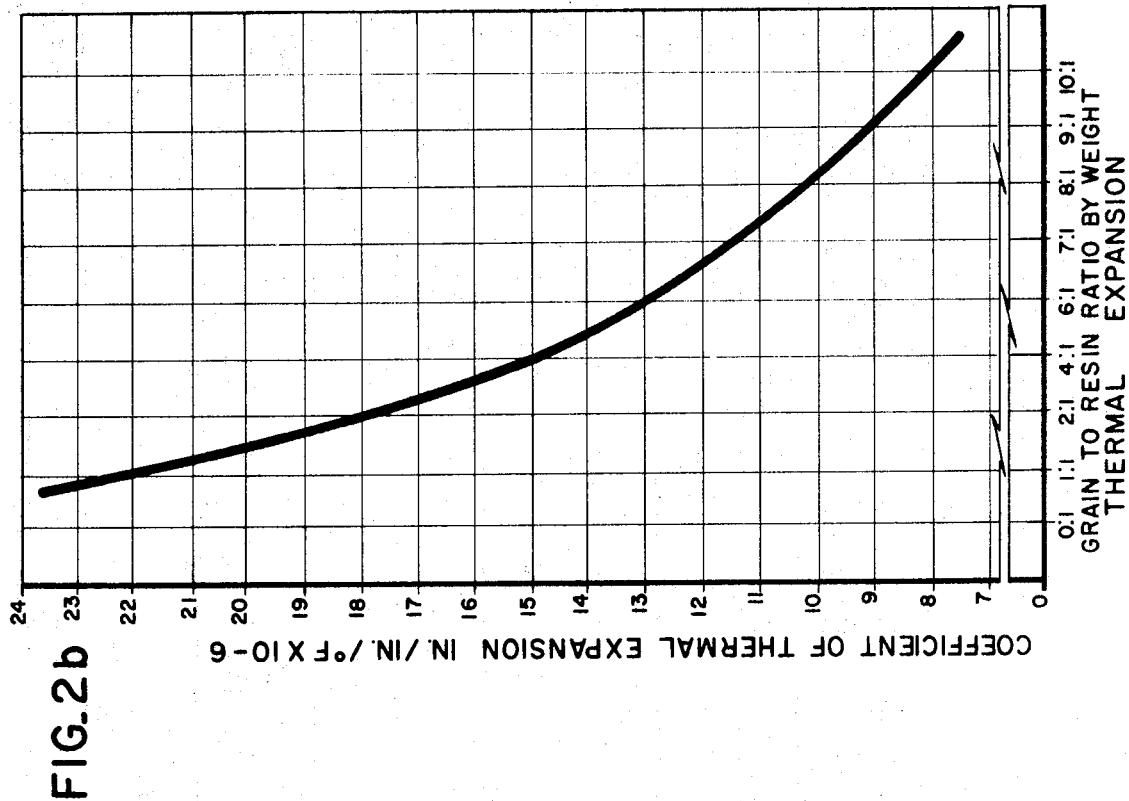

The castable formulations described herein were developed for use in fabricating heated forming tools for plastic-Fiberglas parts. Such tools require high compressive strength at high operating temperature, good abrasion resistance and smooth working faces. Ease of fabrication is a necessity due to cost requirements. Other applications of this product include: heated and room temperature metal forming dies, models, surface plates, lavatories, sinks and fixtures, and low cost corrosion and heat resistant hardware. It should be appreciated that many other applications of this product will undoubtedly be conceived.

Generally speaking, the objects of this invention are achieved by controlling the ratio by weight of resin to filler and/or the ratio by weight of resin to curing agent in the composition.

More specifically, the plastic-ceramic compositions of this invention, which are capable of being molded, are produced by blending a high temperature, high pressure resistant epoxy monomer, a ceramic filler grain and a curing agent and then curing the blended or mixed materials. These epoxy resins are well known in the art and among others they may be diglycerl ethers (for example, epichlorohydrin bisphenol-A and epichlorohydrin acetone), novolac (for example, a resin produced by Dow Chemical Company—Dow D.E.N. 438), and peracetic acid resins (for example, a resin of Union Carbide, E.P. 201). The filler grains are members selected from the group consisting of alumina and mixtures of alumina with any of a variety of optional additives, such as CaO, MgO, $TiO_2$, or $ZrO_2 \cdot SiO_2$. The curing agent is a polyfunctional amine of the general formula

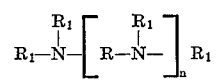

in which R is an aliphatic long chain hydrocarbon of from 1 to 8 carbon atoms, $R_1$ is a member selected from the group consisting of H and a long chain saturated hydrocarbon of from 1 to 8 carbon atoms, and $n$ is 1 or greater, as in the case of a triamine wherein $n$ would be 2. R may also be an aromatic grouping of from 1 to 2 phenyl groups. Thus, R may be either aliphatic or aromatic. Further, the curing agent may be a mixture of both aliphatic and aromatic polyfunctional amines.

Various ceramic filler grain sizes have been experimented with and FIGS. 1a through 1d show the various effects of different alumina grain sizes. FIG. 1a shows that the cure shrinkage increases as the grain size is increased; FIG. 1b shows that the coefficient of thermal expansion of the castable decreases as the grain size increases; FIG. 1c shows that at room temperature the modulus of rupture increases as the grain size increases; and FIG. 1d shows that at 350° F. the modulus of rupture increases as the grain size increases. A comparison between FIGS. 1c and 1d shows that the modulus of rupture is higher at room temperature than at elevated temperatures.

The grain distribution range is chosen as a logical compromise between numerous opposing variables including cure shrinkage, thermal expansion, modulus of rupture, thermal stability of mechanical properties, modulus of elasticity, material costs, ease of handling, etc. As the graphs indicate this comparison involves a trade-off of one desirable property for another since a larger grain size provides a higher modulus of rupture at room tempeature and at elevated temperatures and a lower coefficient of thermal expansion; however, cure shrinkage becomes excessive as the grain size increases, which puts a practical limit on grain size. Obviously, the application to which the castable is to be put and the particular qualities most desirable under each particular circumstance will determine the grain size in the mixture.

The ratio by weight of resin to filler may vary from as high as 1 of resin to around 6 of filler to as low as 1 of resin to around 10 of filler. The exact ratio being determined by the end product properties desires such as minimum cure shrinkage, low coefficient of thermal expansion, viscosity of the mixture, and the like.

Figure 2A:
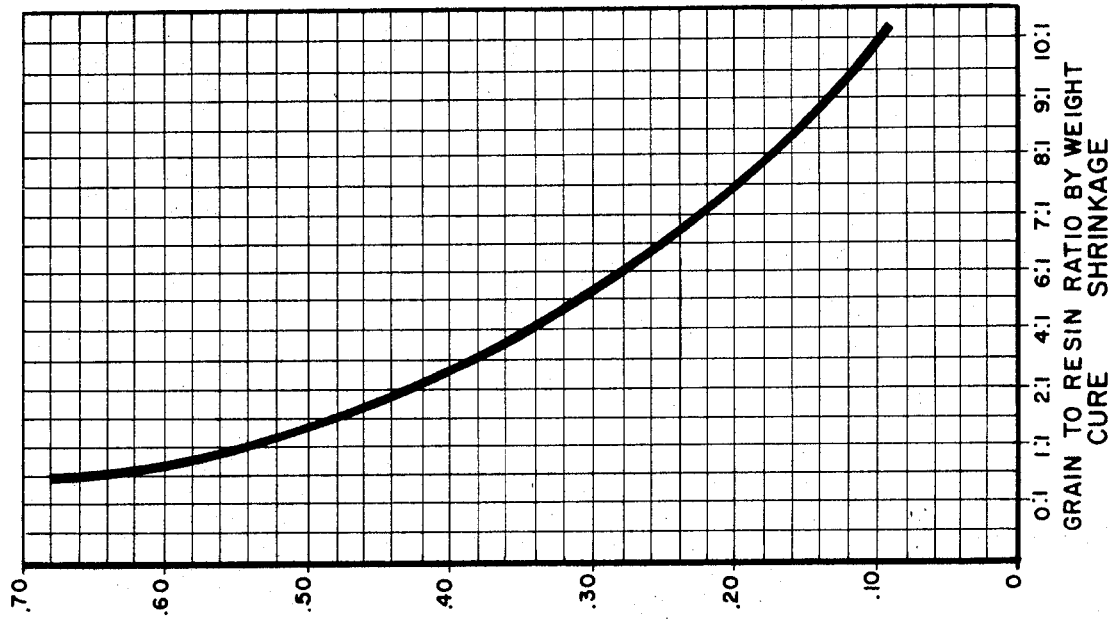

An inspection of FIGS. 2a through 2d shows a range of ratios of ceramic fill to epoxy resin which have been found to provide optimum performance for each condition. FIG. 2a shows that a mixture of below six parts by weight of fill to one part by weight of resin begins to result in excessive cure shrinkage, and FIG. 2b shows that there is a sharp rise in the coefficient of thermal expansion below the ratio of six to one. Accordingly, if cure shrinkage and thermal expansion are critical factors in the use to which the castable is to be applied the six to one fill to resin ratio might be the lower practical limit with which acceptable results can be obtained. As the fill to resin ratio gets higher the viscosity of the mixture increases and the mixture becomes difficult to handle. It has been found that a ten to one fill to resin ratio is the upper practical limit because of the high viscosity of the mixture. As shown in FIG. 2c the modulus of rupture at room temperature is at its optimum when the castable has been mixed with an eight to one grain to resin ratio. Also, inspection of FIGS. 2a and 2b shows that the eight to one ratio is in an acceptable portion of the cure shrinkage curve and the thermal expansion curve. However, under certain circumstances it might be desirable to form the castable with a fill to resin ratio above or below eight to one. For instance, FIG. 2d shows that if the castable is to be used at 350° F., a six to one fill to resin ratio provides the best modulus of rupture. Also, if optimum cure shrinkage and thermal expansion characteristics are of primary concern a ten to one fill to resin ratio would be most desirable. Obviously, as with choosing grain size, the application to which the castable is to be put and the particular qualities most desirable under each particular circumstance will determine the fill to resin ratio.

The following examples illustrate the various properties obtainable with various fill to resin ratios:

EXAMPLE I

The ceramic fill comprising alumina grain passed through a 50 mesh sieve was dry mixed to obtain an even size distribution of the grains therein and then slightly heated to about 150° F. for approximately two hours to remove by evaporation any water that might have been present therein. The epoxy resin, epichlorohydrin-bisphenol A, was heated in an oven at 250° F. for approximately ten minutes until fumes appeared. One part by weight of the hot resin was then poured into four parts by weight of the fill and the batch was throughly mixed. During the mixing process a catalyst, diethylene triamine, was added. The mixture was then poured into a mold and vibrated to remove bubbles therefrom. The mixture was vibrated between three and four minutes at 2,400 to 3,600 vibrations per minute at one-hundredth (0.01) inch minimum amplitude. The curing proceess was begun immediately after the initial set occurred. The A-stage cure was accomplished by heating the casting to 180° F. for two to three hours. After the A-stage cure the casting was removed from the mold and surface bubble holes and chips were repaired. The B and C curing stages were accomplished by heating periods of two hours duration at 250° F. and at 350° F., respectively.

Upon measuring and testing the castable after the casting process was completed, it was found that its cure shrinkage was approximately 0.36 percent of its size; its thermal expansion coefficient was approximately $15 \times 10^{-6}$ inches per inch per degree fahrenheit; its modulus of rupture at room temperature was approximately 8,000 pounds per square inch; and at 350° F. its modulus of rupture was approximately 4,850 pounds per square inch.

EXAMPLE II

A mixture of six parts by weight of fill to one part by weight of resin was prepared in a process similar to that of Example I, the only difference in this example and Example I being the fill to resin ratio. Upon testing this castable after the casting process was completed it was found that its cure shrinkage was approximately 0.28 percent of its size; its thermal expansion coefficient was approximately $12 \times 10^{-6}$ inches per inch per degree Fahrenheit; its modulus of rupture at room temperature was approximately 9,200 pounds per square inch; and at 350° F. its modulus of rupture was approximately 4,900 pounds per square inch.

EXAMPLE III

A mixture of seven parts by weight of fill to one part by weight of resin was prepared in a process similar to that of Example I, the only difference being the fill to resin ratio. Upon testing this castable after the casting process was completed it was found that its cure shrinkage was approximately 0.22 percent of its size; its thermal expansion coefficient was approximately $12.5 \times 10^{-6}$ inches per inch per degree Fahrenheit; its modulus of rupture at room temperature was approximately 9,800 pounds per square inch; and at 350° F. its modulus of rupture was approximately 5,000 pounds per square inch.

EXAMPLE IV

A mixture of eight parts by weight of fill to one part by weight of resin was prepared in a process similar to that of Example I, the only difference being the fill to resin ratio. Upon testing this castable after the casting process was completed it was found that its cure shrinkage was approximately 0.18 percent of its size; its thermal expansion coefficient was approximately $10.3 \times 10^{-6}$ inches per inch per degree Fahrenheit; its modulus of rupture at room temperature was approximately 10,300 pounds per square inch; and its modulus of rupture at 350° F. was approximately 3,500 pounds per square inch.

EXAMPLE V

A mixture of nine parts by weight of fill to one part by weight of resin was prepared in a manner similar to that of Example I, the only difference being the fill to resin ratio. Upon testing this castable after the casting process was completed it was found that its cure shrinkage was approximately 0.14 percent of its size; its thermal expansion coefficient was approximately 8.4×10⁻⁶ inches per inch per degree Fahrenheit; its modulus of rupture at room temperature was approximately 8,700 pounds per square inch; and at 350° F. its modulus of rupture was approximately 4,000 pounds per square inch.

EXAMPLE VI

A mixture of ten parts by weight of fill to one part by weight of resin was prepared in a process similar to that of Example I, the only difference being the fill to resin ratio. Upon testing this castable after the casting process was completed it was found that its cure shrinkage was approximately 0.14 percent of its size; its thermal expansion coefficient was approximately 8×10⁻⁶ inches per inch per degree Fahrenheit; its modulus of rupture at room temperature was approximately 6,500 pounds per square inch; and at 350° F. its modulus of rupture was 2,800 pounds per square inch.

The ratio by weight of resin to curing agent may vary from as low a ratio of one hundred parts of resin and around twenty parts curing agent to as high as one hundred parts resin to around about fifty parts curing agent with the preferred ratio generally being one hundred parts by weight of resin to thirty-five parts by weight of curing agent. These curing agents are of the general formula

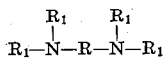

identified hereinbefore. Among the useful curing agents are, for example, diethylene triamine and metaphenylene diamine and mixtures thereof.

The following examples illustrate the various ratios of resins to curing agents and the resulting properties.

EXAMPLE VII

A ceramic fill composed of alumina grain passed through a 50 mesh screen was dry mixed to obtain an even size distribuation of the grains therein and then slightly heated to about 150° F. for approximately two hours to remove any water that might have been present therein. The epoxy resin, epichlorohydrin bisphenol-A, was heated in an oven at 250° F. for approximately ten minutes until fumes appeared. One part by weight of the hot resin was poured into eight parts by weight of the fill and then thoroughly mixed. During the mixing thirty-five parts by weight of metaphenylene diamine, a curing agent, to one hundred parts by weight of the above resin, was added to the mixture.

The mixture was then poured into a mold and vibrated, as hereinbefore described in Example I. The curing process began immediately after the initial set occurred. The A-stage cure was at 180° F. for two to three hours. After this, the casting was removed from the mold and surface bubble holes and chips were repaired. The B-stage of curing was of the molded article at 250° F. for two hours and the C-stage curing was at 350° F. for two hours.

After curing it was found the castable had a modulus of rupture at 70° F. of 4,275 p.s.i. and at 350° F. of 2,100 p.s.i.

EXAMPLE VIII

The exact process of Example VII was repeated except the ratio of curing agent to resin was fifty to one hundred.

This product was tested and found to have a module of rupture at 70° F. and 3,875 p.s.i. and at 350° F. of 2,100 p.s.i.

EXAMPLE IX

The exact procedure of Example VII was followed except the resin was a novolac type as produced by Dow, their resin Dow D.E.N. 438, the ratio by weight of curing agent to resin here was one hundred to twenty-five and the ratio by weight of resin to fill was one to seven, this product was tested and found to have a modulus of rupture of 9,700 p.s.i. at 70° F. and 5,100 p.s.i. at 350° F.

EXAMPLE X

The exact procedure of Example IX was followed except the resin was a peracetic acid type as produced by Union Carbide, E.P. 201, the ratio of resin to fill was one part by weight to seven parts by weight, and the ratio of resin to curing agent, metaphenylene diamine, was 100 parts by weight to 25 parts by weight.

This product was tested and found to have a modulus of rupture of 9,300 p.s.i. at 70° F. and 4,800 p.s.i. at 350° F.

Figure 4:
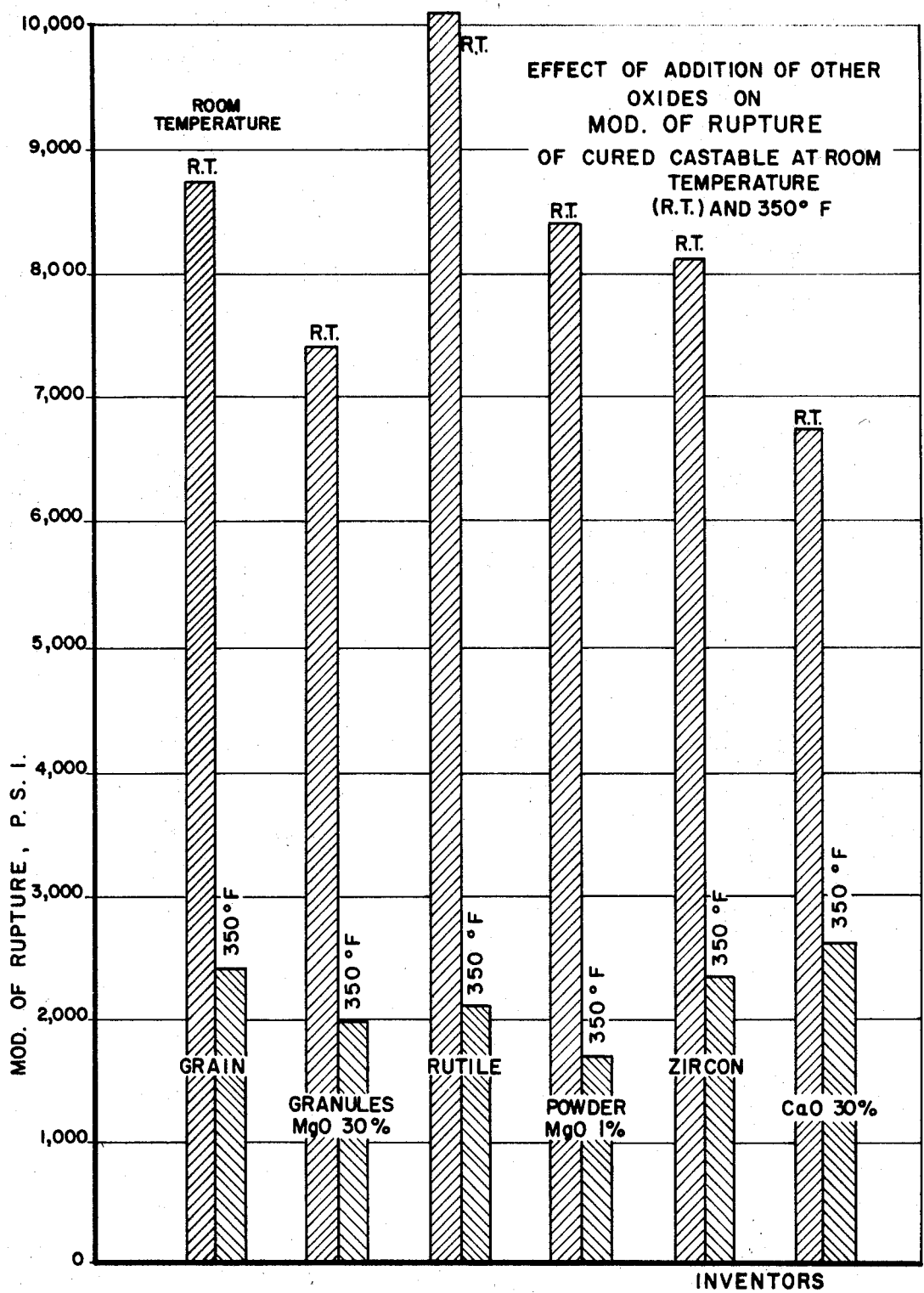
FIG. 4 is a bar graph showing the effects of the addition of oxides other than alumina in the mixture on the modulus of rupture.

In any of the above examples either alpha alumina (crystal form) or fused alumina (amorphous) can be used; however, it was proven that these substances provided different modulus of rupture curves over a range of temperatures. This is shown by FIG. 3 which indicates that better strength qualities were demonstrated by the alpha alumina at both ambient and elevated temperatures; however, these substances can also be chosen for their various qualities to provide optimum results under varying conditions. Also, any of the above examples can be made up of a ceramic fill which comprises from 70 to 100 percent $Al_2O_3$ (alumina) and the remaining parts by weight of an additional material, such as, for example: $CaO$, $MgO$, $TiO_2$ or $ZrO_2 \cdot SiO_2$. The latter two are commercially available as the minerals rutile and zircon. The calcium oxide and magnesium oxide increase the thermal conductivity of the castable and the titanium oxide and the zircon increase the strength and density but are more expensive additives. The modulus of rupture of the castables made from these various fills are plotted in FIG. 4, while Table I shows the properties of the castables mixed with various fills in varying percentages.

Relative to the above examples, it is to be understood that the range set forth for vibration of the mixtures is merely the optimum range in that while vibration may occur at a frequency lower than 2400–3600 vibrations per minute (e.g., 1000 vibrations per minute), the amplitude should preferably be increased, e.g., from 0.010 inch to 0.10 inch. Likewise, should the frequency be increased the amplitude may be decreased.

It is also to be understood relative to the above examples that the heating of the dry ceramic fill may be accomplished by the mixing of the fill in its dry state due to the friction heat generated by mixing.

TABLE I
[Fills in epichlorohydrin-Bisphenol A epoxy]

| No. | Fill | Modulus rupture | Percent curing shrinkage | Density (lb./ft.³) |
|---|---|---|---|---|
| 1 | Unfilled resin | 5,200 | | |
| 2 | 1 pbw resin, 5 pbw Al₂O₃ grain | 6,052 | | |
| 3 | 1 pbw resin, 6 pbw Al₂O₃ grain | 6,670 | 0.35 | |
| 4 | 1 pbw resin, 7 pbw Al₂O₃ grain | 7,790 | 0.33 | |
| 5 | 1 pbw resin, 8 pbw Al₂O₃ grain | 7,960 | 0.25 | |
| 6 | 1 pbw resin, 9 pbw Al₂O₃ grain | 7,070 | 0.24 | |
| 7 | 1 pbw resin, 10 pbw Al₂O₃ grain | 5,730 | 0.15 | |
| 8 | 1 pbw resin 8 pbw fill (90% Al₂O₃—10% CaO) | 8,900 | | 170 |
| 9 | 1 pbw resin 8 pbw fill (70% Al₂O₃—30% CaO) | 7,000 | | 165 |
| 10 | 1 pbw resin, 8 pbw fill (70% Al₂O₃—30% TiO₂) | 6,800 | | 173 |
| 11 | 1 pbw resin, 8 pbw fill (70% Al₂O₃—30% zircon) | 6,900 | | 182 |
| 12 | 1 pbw resin, 8 pbw fill (50% Al₂O₃—50% zircon) | 4,900 | | 189 |
| 13 | 1 pbw resin, 8 pbw fill (90% Al₂O₃—10% MgO) | 6,200 | | 165 |

Items 1 through 7 of Table I indicate that optimum strength is obtained by using approximately 8 parts of $Al_2O_3$ filler to one part of resin. It is believed that this may be because the adhesive bond of epoxy to filler is stronger than the cohesive strength of the epoxy itself. This being the case, as more filler is added, the filled resin depends more on adhesion than cohesion for its strength properties. When more than about 8 parts of filler are used with 1 part resin, the amount of filler becomes so excessive that effective cementing of the filler particles by the resin becomes more difficult.

TABLE II.—GRAIN SIZE EFFECTS

| Number: | Grain sizes fill | Percent curing shrinkage | Modulus rupture |
|---|---|---|---|
| 1 | On 50 mesh | 0.25 | 7,440 |
| 2 | On 20 mesh | 0.19 | 4,009 |
| 3 | (−20+50) mesh | 0.30 | 2,209 |
| 4 | Mixed sizes: (−4+6 mesh) 4%, (−6+8) 16%, (−8+20) 22%, (−20+28) 7%, (−28+35) 5%, (−35+48) 4%, (−48+65) 7%, (−65+100) 11%, (−100+150) 15%, (−150+200) 7%, (−200) 2% | 0.15 | 7,960 |

The alumina grain size distribution for maximum strength is shown in Table II, along with the effects of distribution change. Generally, the quantities of each of these mixed sizes may be varied between plus or minus 20 percent without appreciably affecting the compressive strength of the castable.

Table III makes a comparison between the plastic-ceramic and aluminum alloys.

TABLE III

Plastic-ceramic composition for tools, etc.
(A) Basic Information
 (1) Composition: 1 part by weight plastic—8 parts by weight ceramic
 (2) Density:
  (a) plastic-ceramic composition—170 lb./cu. ft. or 0.1 lb./cu. in.
  (b) aluminum alloys—same (170 lb./cu. ft.)
 (3) Compressive strength
  (a) plastic-ceramic composition—16,000 p.s.i.
  (b) aluminum alloys (as cast) 12,000—20,000 p.s.i.
  (c) red oak (parallel to grain)—7400 p.s.i.
  (d) concrete—8000 p.s.i.
 (4) Flexural strength [1]
  (a) plastic-ceramic composition—11,000 p.s.i.
  (b) aluminum alloys (as cast) 19,000—25,000 p.s.i.
  (c) red oak—14,300 p.s.i.
 (5) Maximum service temperature
  (a) plastic-ceramic composition—350° F. (continuous)
  (b) aluminum alloys (structural)—350° F.
 (6) Coefficient of expansion
  (a) plastic-ceramic composition—$8 \times 10^{-6}$ in./in./° F.
  (b) aluminum—$13 \times 10^{-6}$ in./in./° F.
 (7) Cost
  (a) plastic-ceramic composition—$.32/lb. (current cost)
  (b) aluminum—$1.13/lb. (aircraft grades)

[1] Strength figures for the plastic-ceramic composition reflect measurements on unreinforced specimens. The strength becomes considerably higher when the composition is reinforced with steel rod. Such reinforcing is possible as the thermal expansion of the steel and the composition are compatible both during curing and for high temperature applications.

Thus, contrary to the prior art, it has been discovered that an admixture of refractory oxide (including as a major constituent thereof aluminum oxide) and epoxy resin, when cured, have unexpected high tensile strength and is capable of extended use at elevated temperatures in excess of, for example, 250° F. The fact that the admixture of this invention can be cast into a variety of shaped articles prior to being cured and possess relatively low shrinkage when cured, enables the compositions to be used in a variety of articles including being formed or shaped into matrices or molds from which duplicate articles may be formed.

These matrices or molds were developed for use in fabricating heated forming tools for plastic-Fiberglas parts. Such tools require high compression strength at high operating temperature, good abrasion resistance and smooth working faces. Ease of fabrication is a necessity due to cost requirements. Other applications for the plastic-ceramic aggregates of this invention include heated and room temperature metal forming dies, models, surface plates, lavatories, sinks and fixtures and low cost corrosion and heat resistant hardware. Further applications have been in lay-up blocks, hydroblocks, stretch form blocks, draw dies, and with self-heat tools in which heating elements may be cast into the tools during fabrication.

Also, since the coefficient of thermal expansion of steel is approximately equal to that of the mixture, the use of deformed steel reinforcing rods inside heavy castings is sometimes desirable to increase the strength of the product, especially in resisting bending loads. The arrangement of how the rods are installed in the mold is illustrated in FIG. 5.

It will be understood by those skilled in the art that the embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

What is claimed is:
1. A high temperature plastic-ceramic castable composition comprising an epoxy resin, 6 to 10 parts by weight of a ceramic filler to each 1 part by weight of resin and 25 to 50 parts by weight of a curing agent for each 100 parts by weight of the resin in which: the epoxy resin is a resin selected from the group consisting of (a) diglycerl ethers, (b) novolac, and (c) polyolefins with peracetic acids; the ceramic filler is a member selected from the group consisting of (a) alumina, mixtures of (b) alumina with calcium oxide, (c) alumina with magnesium oxide, (d) alumina with titanium oxide, and (e) alumina with zircon said ceramic filler having mixed grain sizes as follows:

| Mesh: | Percent |
|---|---|
| −4+6 | 4 |
| −6+8 | 16 |
| −8+20 | 22 |
| −20+28 | 7 |
| −28+35 | 5 |
| −35+48 | 4 |
| −48+65 | 7 |
| −65+100 | 11 |
| −100+150 | 15 |
| −150+200 | 7 |
| −200 | 2 | and, said curing agent is of the formula

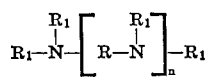

in which R is a member selected from the group consisting of (a) a long chain hydrocarbon of from 1 to 8 carbon atoms and (b) from 1 to 2 phenyl groups; $R_1$ is a member from the group consisting of H and a long chain saturated hydrocarbon of from 1 to 8 carbon atoms; and $n$ is at least 1.

2. The composition of claim 1 wherein said filler is comprised of at least 70 percent by volume alumina, the ratio of resin to filler is 1 to 8, and the ratio of resin to curing agent is 100 to 25.

3. The composition of claim 1 wherein said ceramic filler is alumina having mixed grain sizes as follows:

| Mesh: | Percent |
|---|---|
| −4+6 | 4 |
| −6+8 | 16 |
| −8+20 | 22 |
| −20+28 | 7 |
| −28+35 | 5 |
| −35+48 | 4 |
| −48+65 | 7 |
| −65+100 | 11 |
| −100+150 | 15 |
| −150+200 | 7 |
| −200 | 2 | the quantities of said grain sizes being variable between ± 20%.

4. The composition of claim 3 wherein 25 parts by weight of said curing agent is employed for each 100 parts by weight of resin.

5. The composition of claim 1 wherein said ceramic filler is aluminum oxide employed in a ratio of 8 parts by weight to 1 part by weight of resin.

6. The composition of claim 1 wherein said epoxy resin is epichlorohydrin-bisphenol A and said ceramic filler comprises from about 50 percent to 90 percent by volume of alumina and the remaining volume selected from the group consisting of (a) calcium oxide, (b) magnesium oxide, (c) titanium oxide, and (d) zircon, a total of 8 parts by weight of said ceramic filler being used for 1 part by weight of resin.

References Cited

UNITED STATES PATENTS

| 3,404,195 | 10/1968 | Weinrich | 260—37Ep)X |
| 3,170,890 | 2/1965 | Boyd et al. | 260—37(Ep) |

FOREIGN PATENTS

| 1,151,377 | 7/1963 | Germany | 260—37(Ep) |

OTHER REFERENCES

Harper; Electronic Packaging with Resins; McGraw-Hill Book Co., Inc.; 1961; pp. 41–44, 132–137, 140, and 141; Sci. Lib., TK 7870 H28.

MORRIS LIEBMAN, Primary Examiner

L. T. JACOBS, Assistant Examiner